(12) United States Patent
Galliot

(10) Patent No.: US 11,440,664 B2
(45) Date of Patent: Sep. 13, 2022

(54) SYSTEM FOR SECURING FIXTURES TO A VEHICLE FLOOR COMPRISING PANELS WITH PERFORATED LATERAL WALLS

(71) Applicant: Airbus SAS, Blagnac (FR)

(72) Inventor: André Galliot, Toulouse (FR)

(73) Assignee: Airbus SAS, Blagnac (FR)

( * ) Notice: Subject to any disclaimer, the term of this patent is extended or adjusted under 35 U.S.C. 154(b) by 271 days.

(21) Appl. No.: 16/577,072

(22) Filed: Sep. 20, 2019

(65) Prior Publication Data

US 2020/0094970 A1 Mar. 26, 2020

(30) Foreign Application Priority Data

Sep. 20, 2018 (FR) ...................................... 1858517

(51) Int. Cl.
*B64D 11/06* (2006.01)
*B64C 1/18* (2006.01)

(52) U.S. Cl.
CPC ............ *B64D 11/0696* (2013.01); *B64C 1/18* (2013.01)

(58) Field of Classification Search
CPC ..... B64D 11/0696; B64C 1/18; B60P 7/0815; B60P 7/06; B60P 7/13; B60P 7/08
See application file for complete search history.

(56) References Cited

U.S. PATENT DOCUMENTS

| 5,236,153 A | 8/1993 | LaConte | |
| 8,544,794 B2 | 10/2013 | Ciprian | |
| 9,139,282 B2* | 9/2015 | Benthien | B64C 1/18 |
| 11,008,108 B2* | 5/2021 | Gilbert | B64C 1/20 |
| 2005/0211844 A1 | 9/2005 | Ricaud | |
| 2009/0321606 A1* | 12/2009 | Wilhelm | B64C 1/18 248/503 |
| 2010/0116933 A1* | 5/2010 | Erickson | B64D 11/0696 244/118.5 |
| 2011/0203718 A1 | 8/2011 | Mairou | |
| 2014/0131519 A1* | 5/2014 | Benthien | B64C 1/18 244/131 |
| 2015/0053838 A1* | 2/2015 | Mazidi | B64D 11/0023 248/503 |
| 2019/0106216 A1* | 4/2019 | Spence | B64C 1/18 |
| 2020/0086966 A1* | 3/2020 | Chadwell | B64C 1/18 |
| 2020/0231286 A1* | 7/2020 | Movsesian | B64D 11/0696 |
| 2020/0339267 A1* | 10/2020 | Benthien | B64D 11/0696 |
| 2020/0354065 A1* | 11/2020 | Grewal | B64F 5/10 |

(Continued)

FOREIGN PATENT DOCUMENTS

| DE | 102009038126 A1 | 2/2011 |
| DE | 102015120515 A1 | 6/2017 |
| DE | 102016111999 A1 | 1/2018 |

(Continued)

OTHER PUBLICATIONS

French Search Report; priority document.

*Primary Examiner* — Benjamin P Lee
(74) *Attorney, Agent, or Firm* — Greer, Burns & Crain, Ltd.

(57) ABSTRACT

Systems for securing fixtures to the floor of a transportation vehicle. The securing system has a simplified structure comprising a securing device with two C-profiles comprising a web extending between a top plate and a bottom plate, the profiles being joined by an omega-shape fishplate. Vertical lateral walls formed by the webs of the profiles are perforated.

10 Claims, 4 Drawing Sheets

(56) References Cited

U.S. PATENT DOCUMENTS

2020/0398990 A1* 12/2020 Sasse .................... B60N 2/015

FOREIGN PATENT DOCUMENTS

| DE | 102017104601 | A1 |   | 9/2018 |            |
|----|--------------|----|---|--------|------------|
| EP | 1398208      | A1 | * | 3/2004 | B60P 7/0815 |
| EP | 1564141      | A1 |   | 8/2005 |            |
| FR | 2875520      | A1 |   | 3/2006 |            |
| FR | 2891239      | A1 |   | 3/2007 |            |

* cited by examiner

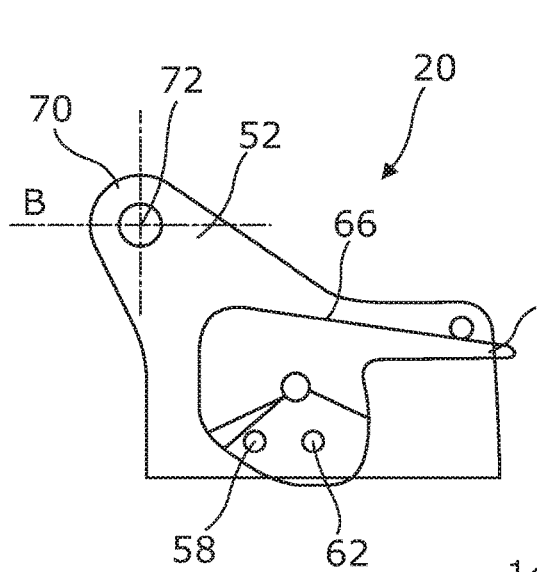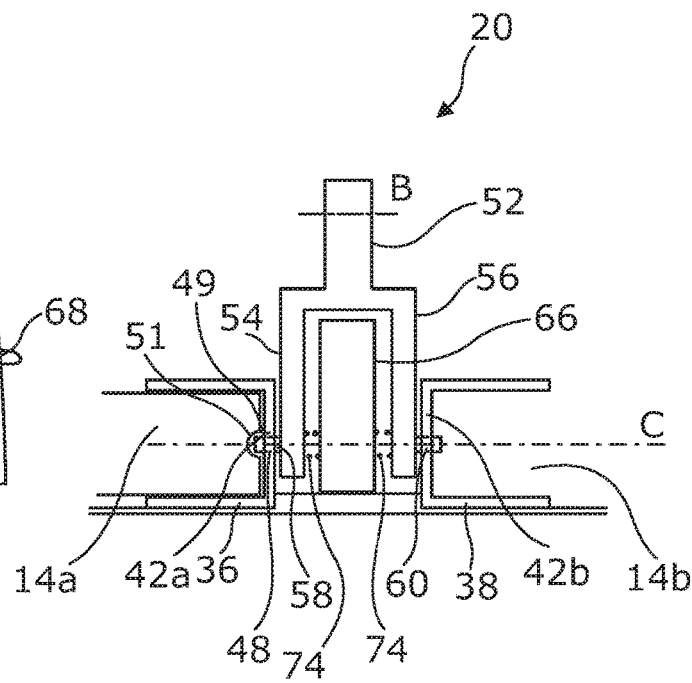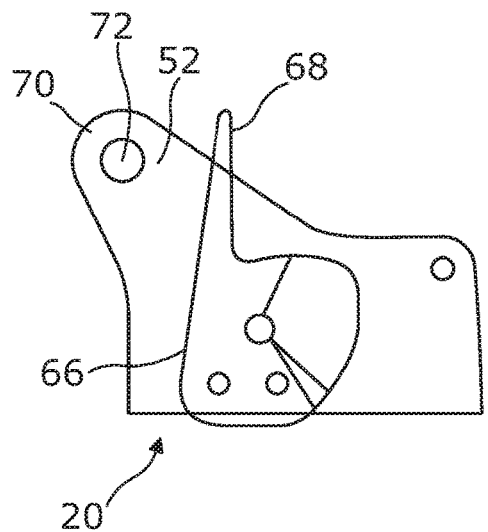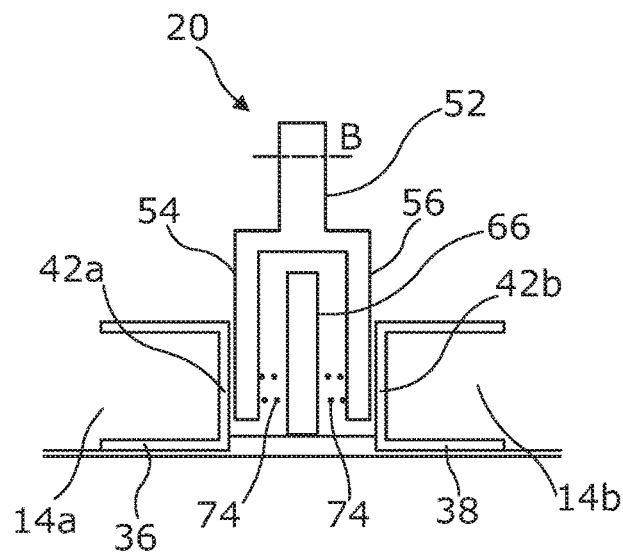
Fig. 7
Fig. 8
Fig. 9
Fig. 10

SYSTEM FOR SECURING FIXTURES TO A VEHICLE FLOOR COMPRISING PANELS WITH PERFORATED LATERAL WALLS

CROSS-REFERENCES TO RELATED APPLICATIONS

This application claims the benefit of the French patent application No. 1858517 filed on Sep. 20, 2018, the entire disclosures of which are incorporated herein by way of reference.

FIELD OF THE INVENTION

The present invention relates to the field of systems for securing fixtures to the floor of a transportation vehicle. It relates more particularly to the system for securing a seat to the floor of an aircraft cabin. The present invention also relates to the corresponding floor panels and floor and the aircraft equipped with such panels.

BACKGROUND OF THE INVENTION

In the field of aeronautics, depending on the airline, the interior layout of the cabin and, notably, the positioning of the seats or the location of the partitions or furnishings may vary. One and the same airline may adopt a different cabin configuration from one aircraft to another, or even in one and the same aircraft during operation. It is thus necessary to provide a highly flexible system with a view to adapting to all possible configurations and to allow easy, rapid installation/removal of fixtures.

One of the known systems consists in securing and locking seats in position with the aid of rails oriented longitudinally and secured to the floor. The seats are provided with appropriate mounting modules for securing to these rails.

Patent FR2891239, filed on 28 Sep. 2005 by AIRBUS FRANCE, relates to such a system for securing fixtures, using rails, to a floor of a transportation vehicle and, more particularly, of an aircraft. The rails have at least one horizontal orifice in the plane of the floor. The rails are inserted in the thickness of the floor panels in recesses provided for this purpose and assembled therewith by polymerization. As set forth in this patent, the rails are constituted from a corrosion-sensitive material, generally aluminum, and are thus exposed to corrosion given the ambient humidity or fluids that might be spilt onto the floor. The fluids enter the recess through the horizontal orifice and slide along the rail, ultimately stagnating in the cavities offered by the rail. The mechanical properties of the rail are thereby adversely affected, which necessitates repairs or replacements.

SUMMARY OF THE INVENTION

An object of the present invention is to propose an alternative solution to the proposed rails that makes it possible to prevent the formation of cavities that promote the retention of moisture or fluids and thereby to reduce the likelihood of corrosion.

The present invention relates to a device for securing fixtures to a floor of a vehicle, characterized in that it comprises two C-profiles formed, respectively, by a web, a bottom flange and an upper flange, of which the webs are perforated, and in that it also comprises an omega-shape fishplate formed by a cap provided with feet.

The present invention also relates to a system for securing fixtures to a floor of a vehicle, characterized in that it comprises a securing device comprising two C-profiles formed, respectively, by a web, a bottom flange and a top flange, the webs of which are perforated, in that the securing device also comprises an omega-shape fishplate formed by a cap provided with feet, and in that the system also comprises mounting means allowing the fixture to be associated with the securing device, the mounting means being provided with structural means using the orifices of the webs for their placing, their holding and their immobilization in the securing device.

The securing system has at least one of the following optional features, taken in isolation or in combination.

The mounting means comprise two lateral flanks provided, respectively, with at least one stud, at least one of which is retractable, the studs having a form and being of a size allowing insertion into the orifices of the webs for holding the housing in position and a part that extends beyond the securing device when the housing is secured thereto, allowing the securing of the fixture.

The present invention also relates to a parallelepipedal floor panel of a vehicle comprising a front wall, a rear wall, a top wall, a bottom wall and two lateral walls, characterized in that at least one of the edges of the front, rear or lateral walls is covered by a C-profile formed by a web, a bottom flange and a top flange, and the webs of which are perforated and have orifices.

The panel may comprise cavities facing the orifices of the webs.

The present invention also relates to a floor comprising at least two panels as characterized above, the floor being characterized in that the webs are joined by an omega-shape fishplate formed by a cap provided with feet, the webs being positioned on either side of the cap and the bottom flanges ensuring securing with the feet.

The floor has at least one of the following optional features, taken in isolation or in combination.

The webs are positioned against the lateral walls of the cap.

The height of the cap is such that the cap lies below the orifices of the webs.

The surface of the web is parallel to the surface of the web, said surfaces lying against the surface of the edges of the cap of the fishplate, the surface of one edge of the cap being parallel to the surface of the other edge.

The present invention also relates to a vehicle comprising supporting crossmembers for parallelepipedal floor panels, each panel comprising a front wall, a rear wall, a top wall, a bottom wall and two lateral walls, the panels being assembled in pairs by means of securing devices comprising two C-profiles formed, respectively, by a bottom flange, a top flange and a web, the webs of which are perforated and have orifices, at least one of the edges of the front, rear or lateral walls of said panels being, respectively, covered by a C-profile, the devices also comprising an omega-shape fishplate joining the webs, the fishplate being formed by a cap provided with feet, the webs of the profiles being positioned on either side of the cap of the fishplate and the flanges of the profiles ensuring securing with the feet of the fishplate, fixtures being associated with the securing devices by mounting means, the mounting means being provided with structural means using the orifices of the webs for their placing, their holding and their immobilization in the securing devices.

BRIEF DESCRIPTION OF THE DRAWINGS

Other objects, advantages and features of the invention will become apparent upon reading the following descrip

FIGS. 7 to 10 show cross-sectional schematic views of the mounting system according to the present invention for a fixture (not shown) on a securing device, FIGS. 7 and 9 being side-on views and FIGS. 8 and 10 being front views, FIGS. 7 and 8 showing the mounting system in the locked position and FIGS. 9 and 10 showing the mounting system in the release position, FIG. 8 partially showing, in a part only of the latter, the panel sandwiched in the securing device.

DETAILED DESCRIPTION OF THE PREFERRED EMBODIMENTS

The present invention applies notably to the field of the transportation of persons or freight and, in particular, to the world of aeronautics. The vehicle 2, given by way of illustration in the following description, is an aircraft designed for commercial passenger transportation. The present invention could apply to any other field and relate to any other type of vehicle for which it is necessary to secure fixtures such as, for example, trains, coaches, ships, etc.

In the following description, the term "transverse" is understood in the sense of the width of the vehicle, the term "longitudinal" is understood as a direction perpendicular to the transverse direction, namely in the sense of the length of the vehicle. The direction perpendicular to both the transverse and longitudinal directions is denoted by the expression "height," and corresponds to the vertical direction.

Figure 1:
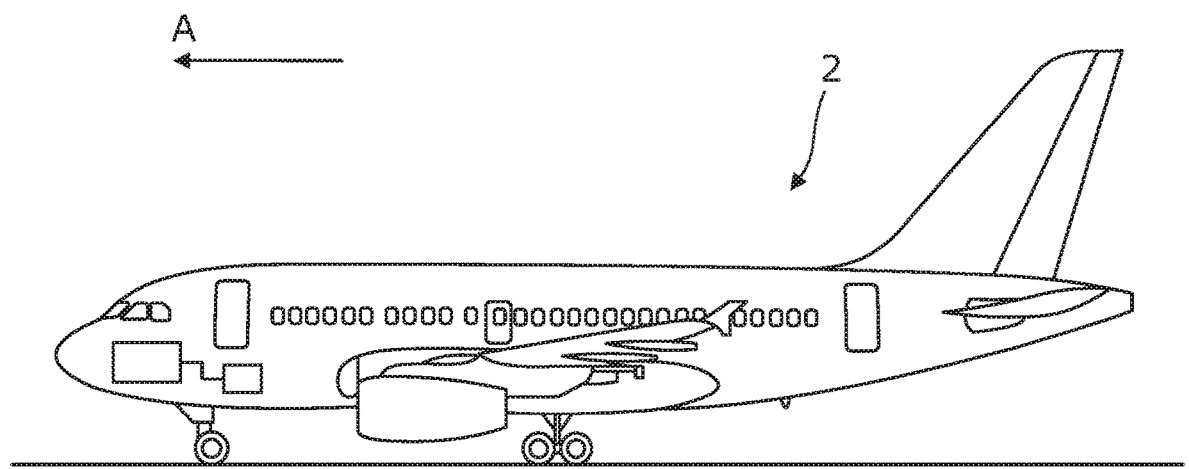
- FIG. 1 shows a side-on schematic plan view of an aircraft capable of incorporating a system according to the present invention.

The terms "front" and "rear" are to be considered relative to the direction of forward movement of the vehicle, this direction being represented by an arrow A in FIG. 1.

Figure 2:
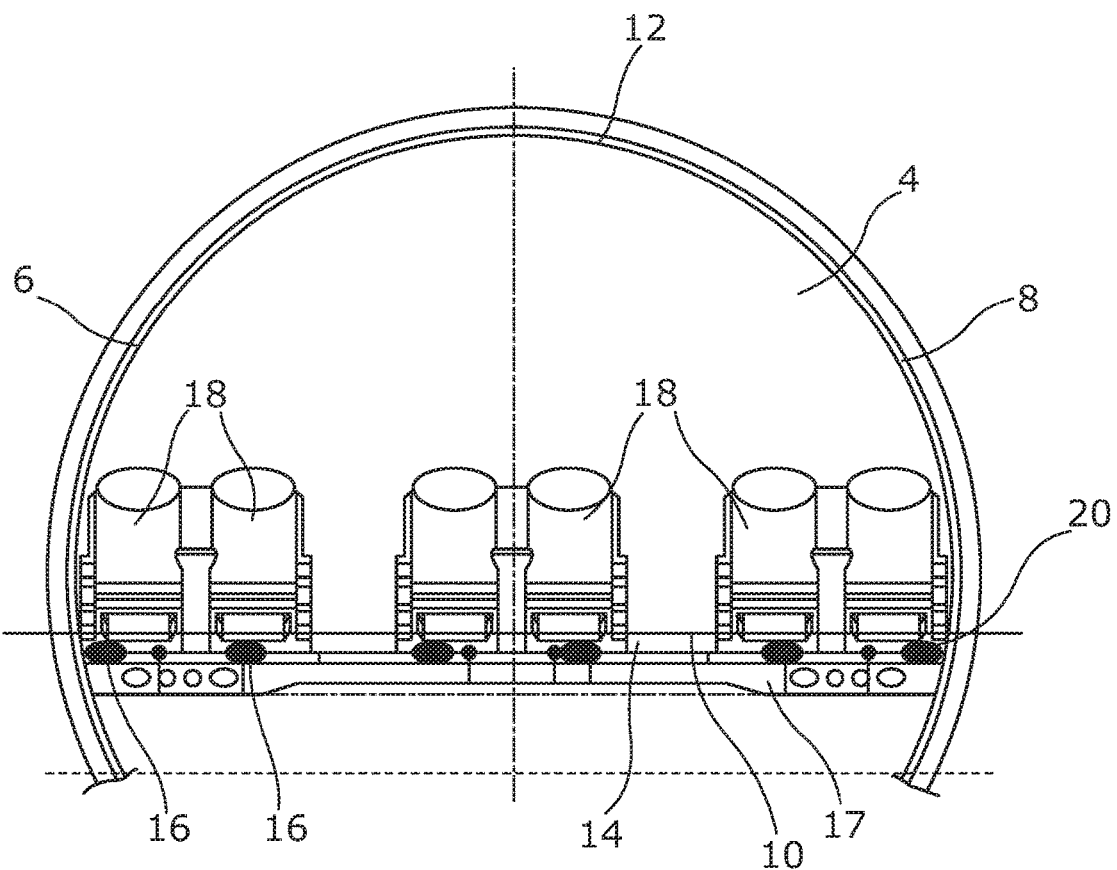
FIG. 2 shows a simplified partial view in transverse section of the interior of a cabin in which seats are installed.

As shown in FIGS. 1 and 2, the aircraft 2 comprises a cabin 4 delimited in a transverse plane by two lateral walls 6, 8, a floor 10 and a ceiling 12. The zone of the aircraft, taken by way of illustration in the remainder of the description, is that of the cabin, but the present invention could apply to other zones of the aircraft such as the cockpit, the hold or the like.

Figure 3:
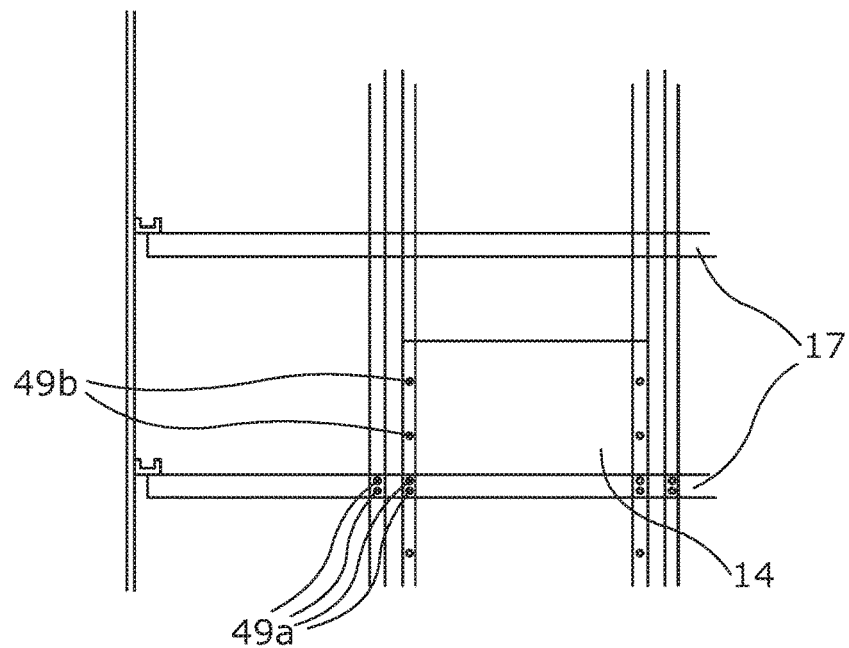
FIG. 3 shows a partial simplified plan view of the securing devices installed on the crossmembers where openings allowing the installation of a screw/nut securing system are shown to illustrate the positioning thereof.

The floor 10 of the cabin 4 comprises panels 14 juxtaposed alongside one another longitudinally and transversely. The panels 14 are separated longitudinally and also transversely by devices 16 for securing fixtures, the assembly formed by the securing devices and the panels resting on beams 17 arranged transversely, also known as "crossmembers." The fixtures may be of varied type such as, for example, seats, separating partitions, furnishings such as galleys, lavatories, etc. As illustrated in FIG. 3, the fixture and, in the case in point, a seat 18 comprises means 20 for mounting on the securing devices 16. In the remainder of the description, the seat 18 is taken as an example of a fixture. The securing system according to the present invention comprises the device 16 for securing fixtures and the means 20 for mounting onto the securing devices 16.

Figure 4:
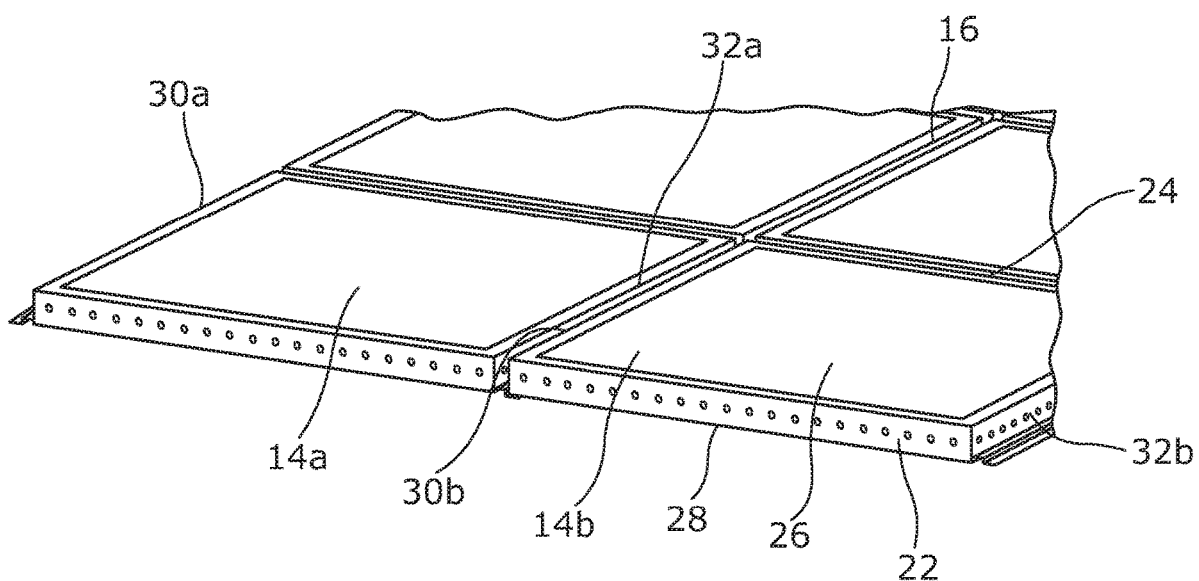
FIG. 4 shows a simplified perspective view of a plurality of floor panels provided with securing devices according to the present invention.

As shown in FIG. 4, the floor panel 14 has a rectangular-cross-section parallelepipedal form and comprises a front wall 22, a rear wall 24, a top wall 26, a bottom wall 28 and two lateral walls 30, 32. The floor panels are generally of honeycomb form. The securing device 16 lies between two lateral edges 32a, 30b of two adjacent panels 14a, 14b (FIG. 4). According to one embodiment, the lateral walls 30, 32 of the panel 14 of honeycomb form are reinforced by resin charged with a filler, such as glass microbeads. The lateral walls of the panel constituting the edges thereof are thus more rigid.

Figure 5:
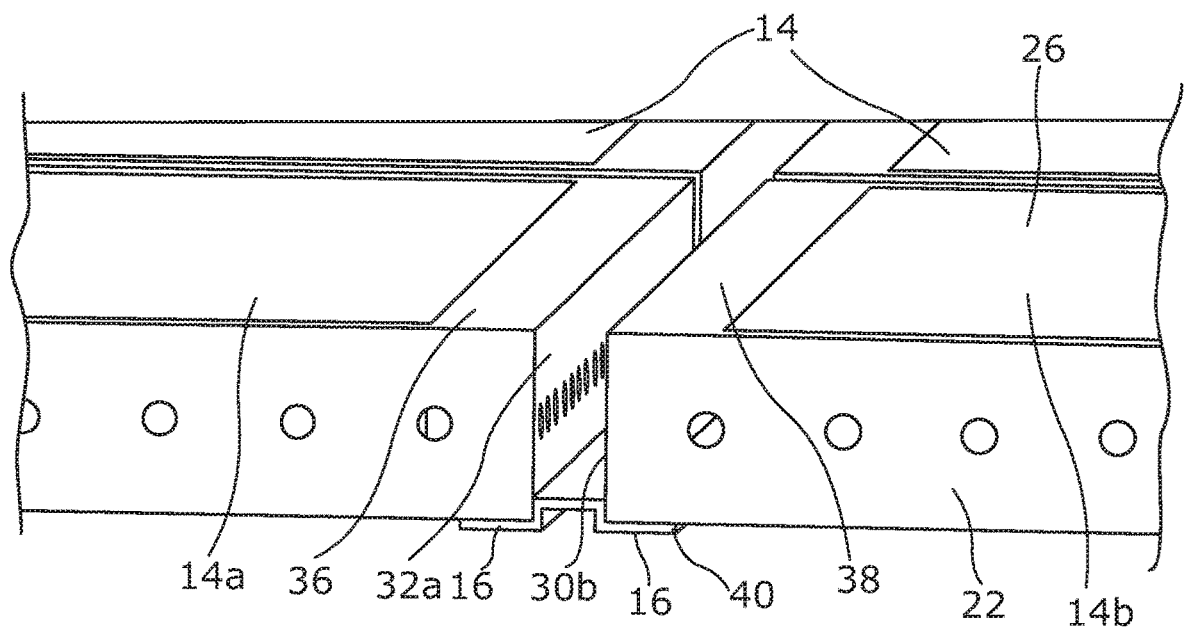
FIG. 5 shows an enlarged view of FIG. 4, in terms of a securing device.
Figure 6:
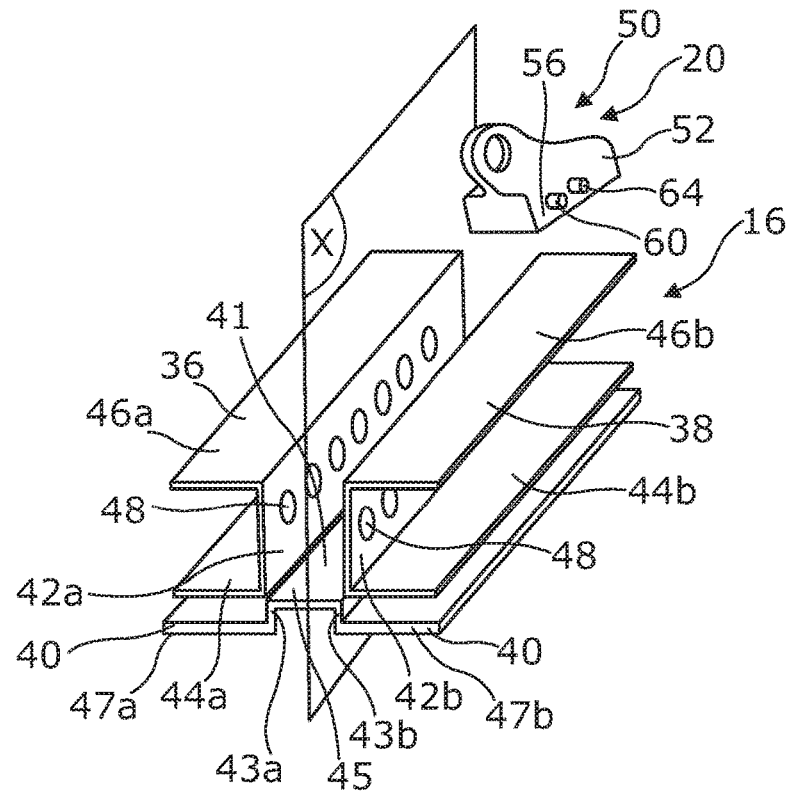
FIG. 6 shows an expanded perspective view of a portion of a securing system comprising the securing device as shown in FIGS. 4 and 5 and an associated mounting system.

As shown in FIGS. 5 and 6, the securing device 16 comprises two C-profiles 36, 38 connected by an omega-shape fishplate 40. Each C-profile comprises a web 42 and, at the opposite ends of the web 42, a bottom flange 44 and a top flange 46. The web 42, the bottom flange 44 and the top flange 46 are of rectangular-cross-section parallelepipedal form. The bottom flange 44 and the top flange 46 are substantially parallel to one another and substantially perpendicular to the web 42, thereby forming an overall C shape. The top flange 46 lies above the bottom flange 44 in the height direction. The web 42 of the profile 36, 38 comprises through-orifices 48 of identical form and dimensions. In the embodiment illustrated, the orifices 48 are distributed uniformly at least in part over the length of the web 42 of the C-profile. The C-profile 36, 38 thus has perforated lateral walls 30, 32 in a vertical plane, the lateral walls corresponding to the webs 42 of the profiles.

The profiles 36, 38 receive, respectively, in the form of a sandwich, a panel 14a, 14b. The profiles 36, 38 are secured to the panels 14a, 14b, respectively, with the aid of an adhesive, for example epoxy resin. As shown in FIG. 8, the lateral walls 30, 32 of the panels have cavities 51 in line with the orifices 48 of the profiles 36, 38 so as to facilitate the functioning of the means for mounting the seat on the securing device, as will be seen below. As the panels 14a, 14b are juxtaposed, the profiles 36, 38 of a securing device 16 lie in opposition back-to-back, the web 42a of the profile 36 being parallel to the web 42b of the profile 38, the bottom flanges 44a, 44b and top flanges 46a, 46b of the profiles 36 and 38 projecting away from the web 42a, 42b. The bottom flange 44a and top flange 46a on the one hand and the bottom flange 44b and top flange 46b on the other, of the profiles 36, 38, receive, respectively, in the form of a sandwich, the adjacent panels 14a, 14b of the floor 10. The fishplate 40 holds the profiles 36, 38 and thus the panels 14a, 14b at a distance, thereby acting as a spacer. The omega-shape fishplate 40 comprises a cap 41 having two lateral walls 43a, 43b connected by a top wall 45 perpendicular to the lateral walls. The height of the lateral walls 43a, 43b of the fishplate is largely smaller than that of the webs 42a, 42b of the C-profiles. The height of the lateral walls is between ⅒th and ⅓rd of that of the webs. Thus, the lateral walls 43a, 43b are not superposed over the orifices 48. The height of the lateral walls 43a, 43b is such that the top wall 45 of the fishplate lies below the orifices 48. The fishplate 40 comprises two feet 47a, 47b on either side of the cap 41. One of the ends of each foot 47a, 47b is connected to the free end of the lateral walls 43a, 43b, respectively. The feet 47a, 47b are in a plane parallel to that of the top wall 45. The feet 47a, 47b are secured to the crossmembers 17 by any known means that allows removal, for example by means of a screw/nut system 49 (FIG. 3). The same screw/nut system may be used to secure the fishplate to the panels 14, the cap 41 of the fishplate thus separating the webs 42a, 42b of the profiles positioned against the lateral walls 43a, 43b of the cap. FIG. 3 shows an example of the positioning of the screw/nut systems 49. In the form illustrated, four screw/nut systems 49a are provided to secure the feet to the crossmembers 17, two per foot. Screw/nut systems 49b are also provided along the feet, uniformly distributed over the entire length for securing with the panel. The securing systems used for securing the profiles on the crossmembers may, as seen previously, also serve for securing the panels to the crossmembers and profiles. The web 42a, 42b of the profile lies in a plane parallel, respectively, to the facing lateral edges 32a, 30b, i.e., also in a plane parallel to the plane X. The lateral edges 32a, 30b of the panels 14a, 14b are connected by the fishplate 40 of the device for securing fixtures. The securing device 16 is symmetrical relative to a central vertical plane X. The orifices 48 of the profiles 36, 38 face one another. The securing device 16 thus has a simple, structuring form. The orifices 48 lie in a plane parallel to the plane of the lateral walls of the adjacent panels 14a, 14b of the floor 10.

Thus, unlike the prior art presented at the beginning of the description, in which the orifices of the securing device having the form of a rail were horizontal, the orifices 48 in the present invention lie in a vertical plane. The orifices 48 of the securing device 16 being vertical, fluids can no longer flow over the floor and stagnate as before, namely by penetrating inside the horizontal orifices of known securing systems. The fishplate 40 makes it possible to hold the profiles 36, 38 at a distance and in position. The fishplate 40 may also serve to secure the panels 14 to the crossmembers 17 of the aircraft.

The profile has a C form that makes it possible, as seen above, to encircle the edges of the floor panel and to protect them, in particular, against impacts. The web 42a, 42b is firmly connected to the lateral edges 32a, 30b of the panel by adhesive bonding or any other known means. The bottom flange 44 and the top flange 46 come into contact with the top wall 26 and bottom wall 28 of the panel, respectively, in order to be secured thereon. Thus, the profile acts as a stiffener, and in addition to connecting and allowing the securing of the fixtures strengthens the structure of the floor panels. In this way, the thickness of the securing device associated with the panels may be reduced and the cabin volume increased as compared with the prior art.

As installation is rapid and easy, the securing devices may readily be repositioned laterally, which affords flexibility when reconfiguring a cabin. To enhance this flexibility, it is possible to envisage providing securing devices of the same type which are not used for securing fixtures but which remain useful in terms of structural reinforcement. In the event of a cabin reconfiguration, an adaptation or any other modification needed in terms of layout, the fixtures can thus be moved from one securing device on which they are secured to a securing device not used for securing.

The mounting system 50 associated with the fixture 18 may have any type of form that offers:

means enabling it to be secured to the fixture 18;
means enabling it to be secured to the securing device 16.

In the remainder of the description, an example of a system 50 comprising the above-mentioned means is described. Any other form of system 50 provided with structural means using the orifices of the webs 42a, 42b for their placing, their holding and their immobilization in the securing device is possible.

In the embodiment illustrated in FIGS. 6 to 10, the mounting system 50 comprises a hollow casing 52. The casing 52 has two parallel lateral flanks 54, 56, the spacing of which is substantially less than the spacing between the webs 42a, 42b of the profiles 36, 38 of the securing device in order to enable the casing to slide inside the securing device, each flank 54, 56 sliding along the webs 42a, 42b of the profiles.

The casing 52 comprises at least two transverse studs 58, 60 capable of being inserted in the orifices 48 of the facing profiles in order to lock the system in position and thereby to secure the fixture 18. In the form illustrated in FIG. 6, the studs are borne by the lateral flanks 54, 56 of the casing; two studs 58, 62 and 60, 64 are present on each flank 54, 56. The studs 58 to 64 have a form adapted for insertion into the orifices 48 and thus have a corresponding form. In the embodiment illustrated in FIGS. 6 to 10, the studs are of cylindrical form with a circular cross section having a diameter slightly less than that of the orifices 48 such that, as seen previously, the stud can be inserted therein in order to lock the casing in position. At least one of the studs is retractable, that is to say, it can move aside for the passage of the casing between the profiles. In embodiments in which the studs are retractable only on one flank and where a plurality of studs are provided on this flank, all of these studs are retractable. The term "retractable" is taken in a very general sense that covers any embodiment of a stud retracting at least partially in order to pass between the profiles and resuming its initial form once it has been placed opposite an orifice, being inserted therein. Thus, the studs could, for example, be retractable, foldable, elastic, clippable, etc. In the following description, the casing comprises four retractable studs. Any other number of studs is possible depending on the tensile force envisaged, which varies from one fixture to another. The spacing between the studs must be identical to that provided between the orifices into which the studs are inserted.

As shown more precisely in FIGS. 7 to 10, a piece 66, called a "latch," allowing retraction of the studs 58, 60, 62 and 64 and locking in position is provided between the lateral flanks 54, 56. It has an arm 68 projecting outside the casing such that it can be seized by an operator and moved inside the casing. The latch 66 can move in rotation and makes it possible to retract the studs inside the flanks when the arm 68 adopts a first position, called the "release" position, which is illustrated in FIGS. 9 and 10. When the latch 66 pivots towards a second position, called the "locked" position, the studs resume their position in which they project from the flanks of the casing, as illustrated in FIGS. 7 and 8. They are entrained towards their locked position, in the embodiment illustrated, by means of compression springs 74.

The casing also comprises a plate 70 provided with a through-hole 72. The plate 70 has a form and size such that when the studs are inserted in the orifices 48 it projects outside the securing device such as to render the hole 72 accessible in order to allow the mounting of the fixture. The axis B of the hole is parallel to the axis C of the studs. The hole is used conventionally for securing corresponding adapted means of the fixture and, for example, a pin, a threaded rod, etc.

The materials of the various elements of the system are chosen notably on the basis of corrosion resistance and manufacturing-cost optimization.

By way of illustration, the profiles 36, 38 and the fishplate 40 may be produced from leaves of metal which are formed by rollers and are corrosion-resistant, such as, for example, corrosion-resistant steel and, more particularly, 304 stainless steel or 17-4PH stainless steel, which allows satisfactory formability. It is also possible to use a titanium alloy and, for example, T-A3V2.5 or, alternatively, commercially pure titanium or even extruded thermoplastics such as, for example, a polyphenylene sulphide (PPS) composite charged with short fibers, such as PPS 40GL.

The casing of the mounting system incorporating the plate 70 may be produced from aluminum, with studs made from steel and the latch 66 made from polyamide, for example PA6-6 or PA6-10.

The fishplate 40 is a folded or extruded profile capable of being machined, if necessary, in view of tight tolerances.

The securing system functions as follows:

An operator commences by placing the fishplates 40 on the crossmembers, in this case by means of assembly by screwing. The panels into which the perforated profiles 36, 38 are incorporated are then secured to the fishplates 40 in accordance with the configuration envisaged for the cabin in question. The orifices of the C-profiles must face one another; to this end, there are tools that make it possible to align orifices before proceeding to secure the panels. The installation of the securing devices is thus rapid and easy.

Other methods of operation may be envisaged.

In order to place the mounting system 50, there are two scenarios, depending on the size of the fixtures.

Either the fixtures are heavy and bulky, and in such a case the mounting system 50 is secured directly to the floor and it is only in a second step that the seat is secured to the mounting system;

or the fixtures are lighter and easier to handle, in which case the mounting system may first be secured to the seat, and it is only in a second step that same is inserted into the securing device in order to be secured and to secure the seat to the floor.

However, any other securing method may be envisaged.

Irrespective of the specific configuration, the placing of the mounting system in the securing device is identical. The sole difference is that the mounting system is integral with the seat or is placed on its own. The operator places the arm 68 of the latch 66 in the release position, which makes it possible to retract the studs 58 to 64 or at least one stud (if there is only one stud on the flank in question) or at least all those on one and the same flank such as to enable the casing 52 to slide inside the securing device 16 between the profiles 36, 38. Once the casing is inside, the operator releases the latch, moving the arm 68 towards its locked position. The released studs move towards the outside of the casing but are halted by the webs 42a, 42b of the profiles 36, 38 until the studs are positioned in front of the orifices 48 into which they are inserted in order to lock the casing 52 in position and also in the cavities 51, if necessary. The hole 72 of the plate 70 remains outside the securing device, i.e., accessible for securing the seat to the securing device.

The operator uses, for example, a pin or a threaded rod for assembling the seat to the mounting system 50, inserting same into the hole 72 of the casing 52.

The principle of securing the seat on the basis of retractable studs inserted into the vertical orifices provided in securing devices greatly facilitates the installation of fixtures in the cabin. If a modification is required, it suffices to unlock the casing 52 from the seat mounting system 50; it is then possible to slide the fixtures along the securing device and thus to move them very easily.

Any other embodiment of the mounting system 50 allowing maintenance in position in the securing device by using the vertical orifices is possible.

Furthermore, as seen previously, the system according to the present invention dispenses with any orifice in a horizontal plane into which fluids may run and stagnate in a cavity.

The overall robustness of the floor is enhanced by the perfect cohesion between panels 14 and securing device.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for securing fixtures to a floor of a vehicle, comprising:
    two C-profiles formed, respectively, by a web, a bottom flange, and a top flange, the webs being perforated and having orifices, and
    an omega-shape fishplate, formed by a cap provided with feet,
    wherein the two C-profiles and the omega-shape fishplate are discrete components,
    wherein the webs are joined by the omega-shape fishplate and are positioned on either side of the cap, the two C-profiles lying in opposition back-to-back, the bottom flanges and top flanges of the two C-profiles projecting away from the web,
    wherein the surfaces of the webs are parallel to each other from the bottom flanges to the top flanges.

2. A system for securing fixtures to a floor of a vehicle, comprising a securing device according to claim 1, and further comprising mounting means allowing the fixtures to be associated with the securing device, the mounting means being provided with structural means using the orifices of the webs for their placing, their holding and their immobilization in the securing device.

3. The securing system according to claim 2, wherein the mounting means comprise two lateral flanks provided, respectively, with at least one stud, at least one of the studs being retractable, the studs having a form and being of a size allowing insertion into the orifices of the webs for holding said means in position and having a part that extends beyond the securing device when said mounting means are secured thereto, allowing the securing of the fixture.

4. A floor comprising at least two parallelepipedal panels comprising a front wall, a rear wall, a top wall, a bottom wall and two lateral walls, and comprising a securing device according to claim 1, and at least one edge of the front, rear or lateral walls being covered by one of the two C-profiles, the panels being assembled in pairs by securing devices, the bottom flanges ensuring securing with the feet, the fishplate holding the two C-profiles and thus the panels at a distance.

5. The floor according to claim 4, wherein the panel comprises cavities opposite the orifices of the webs.

6. The floor according to claim 4, wherein the webs are positioned against the lateral walls of the cap.

7. The floor according to claim 4, wherein a height of the cap is such that the cap lies below the orifices of the webs.

8. The floor according to claim 4, wherein the surfaces of the webs are parallel to each other, said surfaces lying against a surface of edges of the cap of the fishplate, a surface of one edge of the cap being parallel to a surface of an opposite cap edge.

9. A vehicle comprising supporting crossmembers for a floor with a securing device according to claim 4, the securing device further comprising mounting means allowing the fixtures to be associated with the securing device, the mounting means being provided with structural means using the orifices of the webs for their placing, their holding and their immobilization in the securing device, the fixtures being associated with the securing devices by mounting means, the mounting means being provided with structural means using the orifices of the webs for their placing, their holding and their immobilization in the securing devices.

10. A floor comprising:
    at least two parallelepipedal panels comprising a front wall, a rear wall, a top wall, a bottom wall and two lateral walls, and a securing device comprising two C-profiles formed, respectively, by a web, a bottom flange, and a top flange, the webs being perforated and having orifices, and an omega-shape fishplate, formed by a cap provided with feet, wherein the webs are joined by the omega-shape fishplate and are positioned on either side of the cap, the two C-profiles lying in opposition back-to-back, the bottom flanges and top flanges of the two C-profiles projecting away from the web, and at least one edge of the front, rear or lateral walls being covered by one of the two C-profiles, the panels being assembled in pairs by securing devices, the bottom flanges ensuring securing with the feet, the fishplate holding the two C-profiles and thus the panels at a distance, and wherein the panel comprises cavities opposite the orifices of the webs.

\* \* \* \* \*